US007407637B2

(12) United States Patent
Incavo et al.

(10) Patent No.: US 7,407,637 B2

(45) Date of Patent: Aug. 5, 2008

(54) OXYGEN SCAVENGING MATERIAL AND USE THEREOF FOR REDUCING OXYGEN CONTENT IN AIR CAVITIES OF MOUNTED TIRES

(75) Inventors: Joseph Alan Incavo, Hudson, OH (US); Richard Earl Woodcock, Cuyahoga Falls, OH (US); Edward Lee Johnson, Richfield, OH (US); Lewis Timothy Lukich, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 365 days.

(21) Appl. No.: 11/220,217

(22) Filed: Sep. 6, 2005

(65) Prior Publication Data

US 2007/0053816 A1 Mar. 8, 2007

(51) Int. Cl.
*B01D 53/00* (2006.01)
*B60C 99/00* (2006.01)

(52) U.S. Cl. ....................................... 423/219; 152/151

(58) Field of Classification Search ................. 423/219; 152/151

See application file for complete search history.

(56) References Cited

U.S. PATENT DOCUMENTS 3,370,915 A * 2/1968 Sperberg .................... 423/219
3,560,143 A * 2/1971 Sperberg .................... 423/219
6,374,869 B2 4/2002 Makino et al.
6,605,654 B1 8/2003 Fang et al.
6,675,851 B1 1/2004 Masson et al.
6,698,483 B2 3/2004 Pagano et al.
2006/0032568 A1* 2/2006 Lechtenboehmer et al. . 152/510
2007/0209744 A1* 9/2007 Matsumura ................ 152/510

FOREIGN PATENT DOCUMENTS

JP 2002-337507 A * 11/2002

* cited by examiner

*Primary Examiner*—Timothy C Vanoy
(74) *Attorney, Agent, or Firm*—Wood, Herron & Evans, L.L.P.

(57) ABSTRACT

The present invention provides for oxygen scavenging materials and uses thereof for reducing oxygen content in an air cavity of a mounted tire, such as to reduce oxidation of a tire. The oxygen scavenging material can include a metal or metal-based material, an antioxidant, or microorganism. In one example, the oxygen scavenging material may be situated or secured within a tire cavity or secured to the tire rim of a wheel prior to mounting of the tire on the rim. Accordingly, the tire is mounted on the tire rim to define an air cavity with the oxygen scavenging material being located therein. The air cavity is be filled with air comprising oxygen to a desired internal air pressure with the oxygen scavenging material being provided in an amount sufficient for reducing oxygen content in the air cavity, such as to reduce oxidation of the tire thereby increasing the lifespan thereof.

19 Claims, 5 Drawing Sheets

FIG—4

OXYGEN SCAVENGING MATERIAL AND USE THEREOF FOR REDUCING OXYGEN CONTENT IN AIR CAVITIES OF MOUNTED TIRES

FIELD OF THE INVENTION

The present invention pertains to oxygen scavenging material and to methods of use thereof for reducing oxygen content in air cavities of mounted tires, such as to reduce oxidation of the tire and/or increase tire pressure retention.

BACKGROUND OF THE INVENTION

The oxidation of tires typically results in a reduced lifespan of the tire. The underinflation of tires also reduces tire lifespan and is the source of other detrimental effects such as reduced rolling resistance and irregular wear. Therefore, it is important to improve the endurance of tires in relation to tire pressure retention and to the oxidizing processes of the rubber compositions and the metallic or textile reinforcement thereof.

One known method of reducing oxidation phenomena has involved using a layer of butyl rubber, which is substantially impermeable to oxygen, that is applied to the inside wall of the tire. This use restricts the amount of oxygen coming from the tire inflation air that gets to zones of the tire that are particularly sensitive to oxidation. Unfortunately, butyl rubber is not totally impermeable and the flow of oxygen into the body of the tire, though reduced, produces undesirable oxidation phenomena over the long term as well as underinflation.

Another way to avoid oxidation problems is to trap the oxygen chemically by the accelerated thermal oxidation of a rubber composition that acts as a buffer, located between a main source of oxygen and the zone to be protected against oxidation phenomena. For example, such a buffer composition is located between the inside face of the tire liner, composed of butyl rubber, and the carcass ply to reduce the amount of oxygen that comes into contact with the carcass ply from the inflation air. Unfortunately, the use of these buffer compositions is believed to result in oxidation of the rubber in that zone. It also does not impact the loss in inflation pressure due to oxygen absorption by the tire.

Lastly, it is known to use nitrogen gas and propellants including gas-generating agents, in place of air, to fill the air cavities of mounted tires, i.e. tires already situated on the tire rim. However, these uses require either a nitrogen source and/or after market canisters including the nitrogen or gas-generating agents.

Accordingly, there is a need for an improved method of reducing oxygen content in air cavities of mounted tires to increase the lifespan of the tire, such as by reducing the oxidation of the tire and increasing tire pressure retention.

SUMMARY OF THE INVENTION

The present invention provides for a method to reduce the oxygen content in air cavities of tires mounted on tire rims using an oxygen scavenging material. And, since tire pressure loss can be due to oxygen permeation into the tire, inflation pressures can be better maintained in an oxygen reduced air cavity, thereby providing improvements in rolling resistance and irregular treadwear, i.e. decreasing rolling resistance and reducing irregular treadwear.

The oxygen scavenging material of the present invention can include a metal or metal-based material, an antioxidant, or microorganism. The oxygen scavenging material may be situated or secured within a tire cavity or secured to the tire rim of a wheel prior to mounting of the tire on the rim.

Accordingly, the tire is mounted on the tire rim to define an air cavity with the oxygen scavenging material being located therein.

The air cavity then may be filled with air containing oxygen to a desired internal air pressure with the oxygen scavenging material having been provided in an amount sufficient for reducing oxygen content in the air cavity. In one example, the amount sufficient includes any amount of material that reduces the oxygen content in the air cavity. The desired internal air pressure, in one example, is no greater than about 21% over the manufacturer's recommended air pressure. The oxygen scavenging material scavenges or reacts with the oxygen in the air cavity, such as by physical sorption or chemically reacting with the oxygen, to reduce the oxygen content therein. This reduced oxygen content reduces oxidation of the tire and may provide improvements in rolling resistance and irregular treadwear, thereby increasing the lifespan of the tire.

The oxygen scavenging material also may be provided in an after market canister that can be fitted to a valve that is associated with the air cavity. The canister seal can be broken upon fitting to the valve and the oxygen content in the air cavity reduced via molecular diffusion of oxygen into the canister. In another example, the canister is adapted to propel the oxygen scavenging material into the air cavity through the valve to reduce the oxygen content in the air cavity.

By virtue of the foregoing, there is thus provided an improved method of reducing oxygen content in air cavities of mounted tires to increase the lifespan of the tire, such as by reducing the oxidation of the tire.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE DRAWINGS

Figure 1:
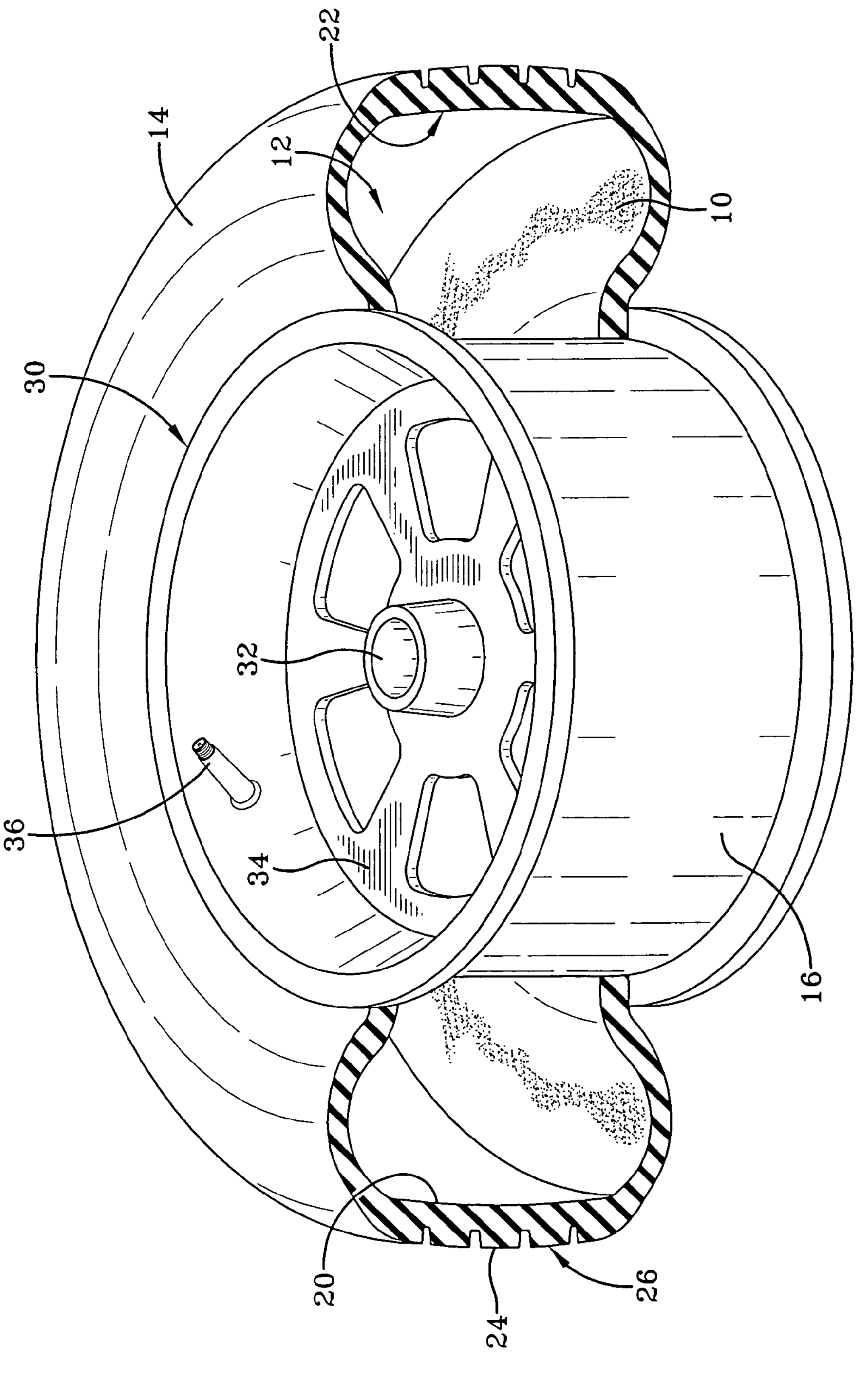
FIG. 1 is a perspective view of a tire mounted on a rim with a portion of the tire being cut-away to show oxygen scavenging material illustrating an embodiment in accordance with the present invention.

The present invention, as shown in FIGS. 1-4, is directed towards oxygen scavenging materials 10 and uses thereof for reducing oxygen content in an air cavity 12 of a tire 14 mounted on a rim 16, such as to reduce oxidation of the tire 14 and/or retain the desired tire pressure longer.

The oxygen scavenging material 10 of the present invention can include a metal or metal-based material. The metal may include iron, manganese, molybdenum, copper, chromium, cerium and the like and may be in granular (or powder-like) form. In one example, the oxygen scavenging material 10 is a granular iron which reacts with or scavenges the oxygen in the air of the tire filled with air to form iron (II) hydroxide, $Fe(OH)_2$, to reduce oxygen content in the air cavity 12 of the mounted tire 14.

The oxygen scavenging material 10 may also include an antioxidant, such as a diphenylamine antioxidant. Diphenylamine antioxidants are capable of reacting directly react with oxygen. The antioxidant also may include an ascorbic acid based material. The ascorbic acid based material may be ascorbic acid (Vitamin C). Ascorbic acid is understood to scavenge oxygen to form dehydroascorbic acid. A transition metal also may be used as a catalyst with ascorbic acid and/or can be used in combination with sulfite that can be further oxidized to sulfate to further promote oxygen scavenging.

The oxygen scavenging material 10 may further include a microorganism, such as an aerobic microbe. In one example, the microorganism is provided in the form of baker's yeast that is mixed with one or more additives, e.g. water, sugar, and calcium oxide, to allow for fermentation. The fermentation reaction of baker's yeast scavenges oxygen to produce carbon dioxide and ethanol.

As best shown in FIG. 1, the tire 14 includes an inner surface 20 defining a tire cavity 22 and an outer surface 24 defining a tread 26. The tire 14 is shown already mounted on the rim 16 of a wheel 30 to define the air cavity 12. For purposes herein, the rim 16 includes any portion of the wheel 30 that constitutes a portion of the air cavity 12. The wheel 30 also includes a hub 32 attached to the rim 16 via spokes 34. The tire 14 may be mounted on the rim 16 by any means known in the art, such as via a tire-mounting machine (not shown).

Prior to mounting the tire 14 on the rim 16, the oxygen scavenging material 10, e.g. granular iron, is placed in the tire cavity 22. This placing may be performed manually such as by sprinkling the granular iron into the tire cavity 22. Then, the tire 14 is mounted on the rim 16. One skilled in the art should understand that any of the aforementioned oxygen scavenging materials 10 may be utilized in the place of the granular iron.

The oxygen scavenging material 10 is provided in an amount sufficient for reducing oxygen content in the air cavity 12, such as to reduce oxidation of the tire 14. In one example, the amount sufficient includes any amount of material 10 that reduces the oxygen content in the air cavity 12. The air cavity 12 then may be filled with air, such as compressed air, by way of a valve 36 to a desired internal air pressure. This compressed air contains oxygen and, as atmospheric air, specifically includes about 21% oxygen, 78% nitrogen, and about 1% other gases. As such, the desired air pressure when filling the tire, in one example, may be no greater than about 22% over the manufacturer's recommended air pressure for the tire 14. The oxygen scavenging material 10 is capable of scavenging or chemically reacting with the oxygen in the air to reduce the oxygen content in the air cavity 12, such as to produce a substantially nitrogen-filled tire. Also, inflation pressures can be better maintained in an oxygen reduced air cavity since tire pressure loss is partially due to oxygen permeation into the tire 14, thereby providing improvements in rolling resistance and irregular treadwear.

Figure 2:
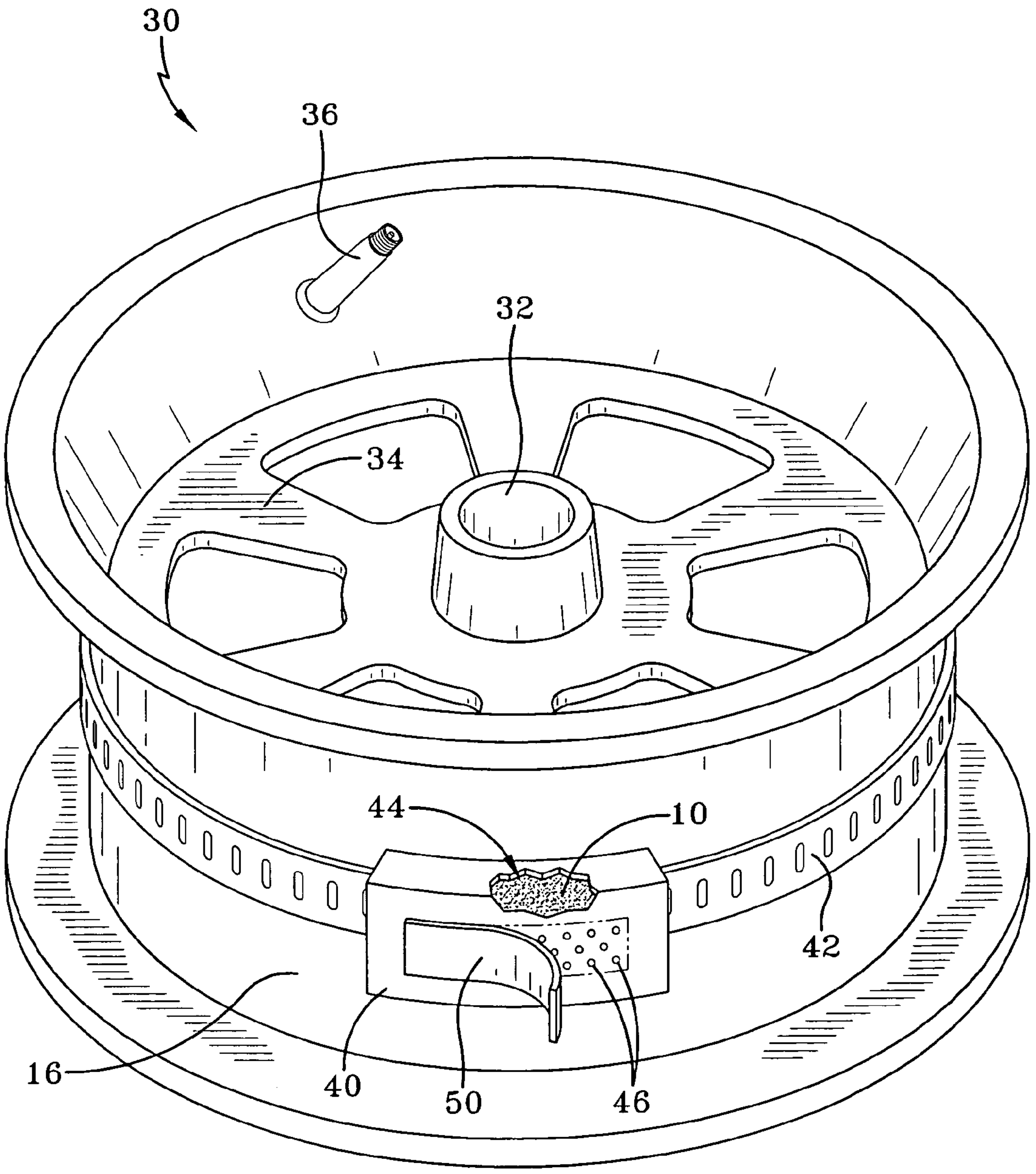
FIG. 2 is a perspective view of a wheel and container with oxygen scavenging material being secured thereraround illustrating another embodiment in accordance with the present invention.

FIG. 2 shows rim 16 having a container 40 defining a rectangular box secured therearound, such as by a metal screw clamp 42. The clamp 42 may be secured to the container 40 and the container 40 may be secured to the rim 16 by any means known in the art. The container 40 defines a cavity 44 that is adapted to hold the oxygen scavenging material 10, e.g. granular iron. The container 40 further is provided with a plurality of apertures 46 to expose the oxygen scavenging material 10 to the atmosphere in the air cavity. An adhesive strip 50, as is known to those of ordinary skill in the art, may be removably secured to the container 40 to cover the apertures 46 until it is desired to expose the material 10 to the atmosphere.

In one example, the adhesive strip 50 is removed prior to mounting the tire 14 to the rim 16. Then, the tire 14 (FIG. 1) is mounted to the rim 16 and the air cavity 12 filled to a desired pressure such as with compressed air by way of the valve 36. This compressed air contains oxygen. Accordingly, the oxygen scavenging material 10 is provided in an amount sufficient for reducing oxygen content in the air cavity 12, thereby reducing oxidation of the tire 14. More specifically, the oxygen scavenging material 10 is capable of scavenging or chemically reacting with the oxygen to reduce the oxygen content in the air cavity 12. The oxygen scavenging material 10 may include any of the aforementioned materials.

Figure 3:
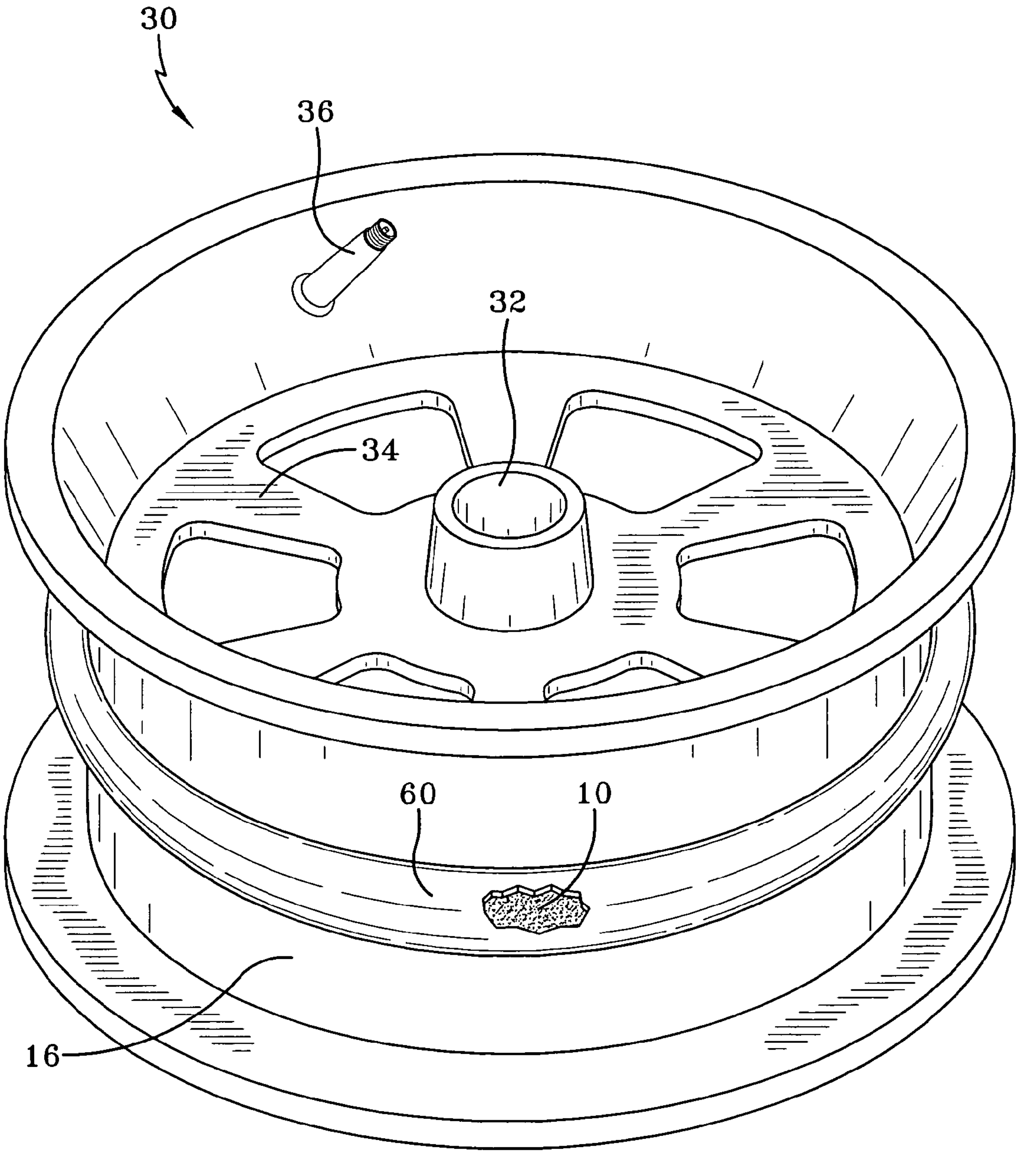
FIG. 3 is a perspective view of a wheel and container with oxygen scavenging material being secured thereraround illustrating another embodiment in accordance with the present invention.

In FIG. 3, the oxygen scavenging material 10, e.g. granular iron, is provided in a container 60 defining a stretchable or elastic tube made from an elastomeric material (e.g. natural rubber), which is permeable to oxygen. Prior to mounting of the tire 14, the tube 60 including the oxygen scavenging material 10 may be removed from an air-tight container or wrapping (not shown), and then secured around the rim 16 of the wheel 30. The rate of oxygen consumption is controlled by the porosity of the elastomer and can be adjusted accordingly by selecting a desired elastomeric material. The tire 14 then is mounted and filled with air. As described above, the oxygen scavenging material 10 is provided in an amount sufficient for reducing oxygen content in the air cavity 12, thereby reducing oxidation of the tire 14 and improving tire pressure retention. Again, the oxygen scavenging material 10 may include any of the aforementioned materials.

Figure 4:
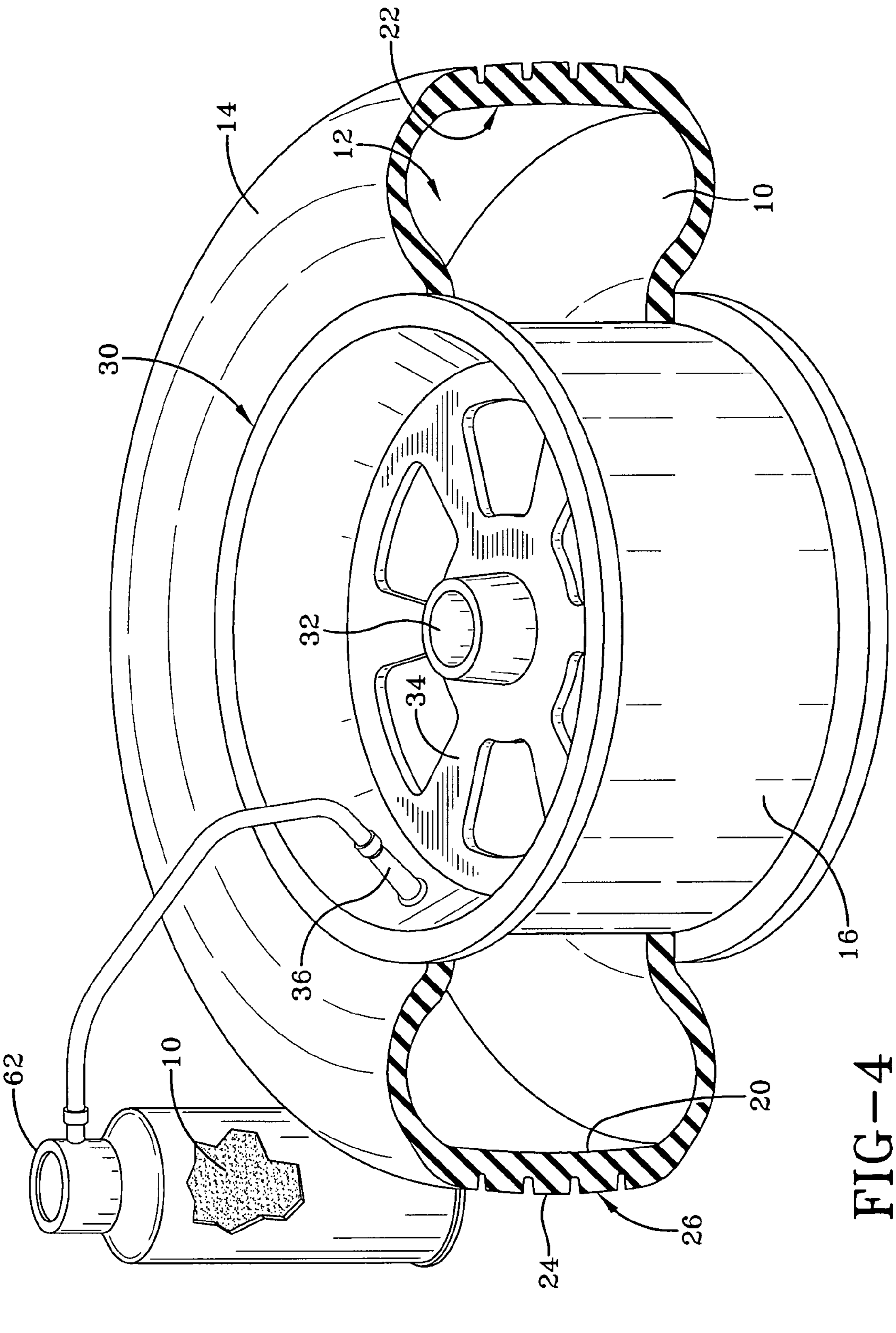
FIG. 4 is a perspective view of a canister containing oxygen scavenging material cooperating with a valve associated with the air cavity of a mounted tire illustrating another embodiment in accordance with the present invention.

In FIG. 4, the oxygen scavenging material 10, e.g. granular iron, is provided in an after market canister 62 that is fitted, e.g. screwed, onto valve 36 that is associated with air cavity 12 of mounted tire 14. The canister seal (not shown) can be broken upon fitting to the valve 36 and the oxygen content in the air cavity 12 reduced via molecular diffusion of oxygen into the canister 62. In another example, the canister 62 may be adapted by means known in the art to propel the oxygen scavenging material 10 into the air cavity 12 of the mounted tire 14, which may be a spare tire, via the valve 36 to scavenge oxygen within the air cavity 12. The tire 14 may be either deflated or already inflated to a desired pressure, as discussed above, prior to use of the canister. As described above, the oxygen scavenging material 10 is provided in an amount sufficient for reducing oxygen content in the air cavity 12. And, the oxygen scavenging material 10 may include any of the aforementioned materials.

It should be understood by one skilled in the art that the oxygen scavenging material 10 may be provided in other forms, i.e. other than granular or powder-like form. It should be further understood that the oxygen scavenging material 10 may be secured to the inner surface 20 of the tire 14 or to the rim 16 by other means, such as by being sprayed on or adhesively secured thereto by any means known in the art.

As stated above, the oxygen scavenging material 10 includes an amount sufficient which is any amount that reduces the oxygen content in the air cavity 12 by reacting with, or scavenging, the oxygen therein. In one example, the amount sufficient includes not less than about 50 mg of oxygen scavenging material 10. In another example, the oxygen scavenging material 10 may be provided in an amount of not less than about 100 g. In yet another example, the oxygen scavenging material 10 may be provided in an amount of not less than about 250 g. In another example, the oxygen scavenging material 10 may be provided in an amount not less than about 550 g.

Also, the desired internal air pressure of the tire 14, after filling, may be adjusted according to the amount of oxygen scavenging material 10 provided, or to be provided, in the air cavity 12 so that the resulting air pressure may be about the manufacturer's recommended air pressure for the tire 14. In one example, a sufficient amount of material 10 is provided in the air cavity 12 to scavenge all of the oxygen therein such that the desired internal air pressure when filling the tire 14 is about 21% greater than the manufacturer's recommended air pressure.

A non-limiting example of the use of an oxygen scavenging material 10 comprises a metal-based material for reducing oxygen content in the air cavity 12 of the tire 14 in accordance with the present invention is presented below.

Each of about 250 g and about 500 g of a metal-based material and, more specifically, a granular iron material called Ageless ZPT1000 available from Mitsubishi Gas of New York, N.Y. was placed within individual tire cavities of a Goodyear Regatta 2 passenger tire (P225/60R16). The tire then was mounted on a tire rim so that the oxygen scavenger was situated freely in the air cavity. Each tire was filled with compressed air to a target inflation pressure of about 38 psig, which was about 21% greater than the target pressure, or manufacturer's recommended tire pressure, of 29 psig. Accordingly, the 21% increase takes into effect the amount of oxygen (21%) present in the air, i.e. the earth's atmosphere, which may be completely scavenged or reacted with the oxygen scavenger.

Figure 5:
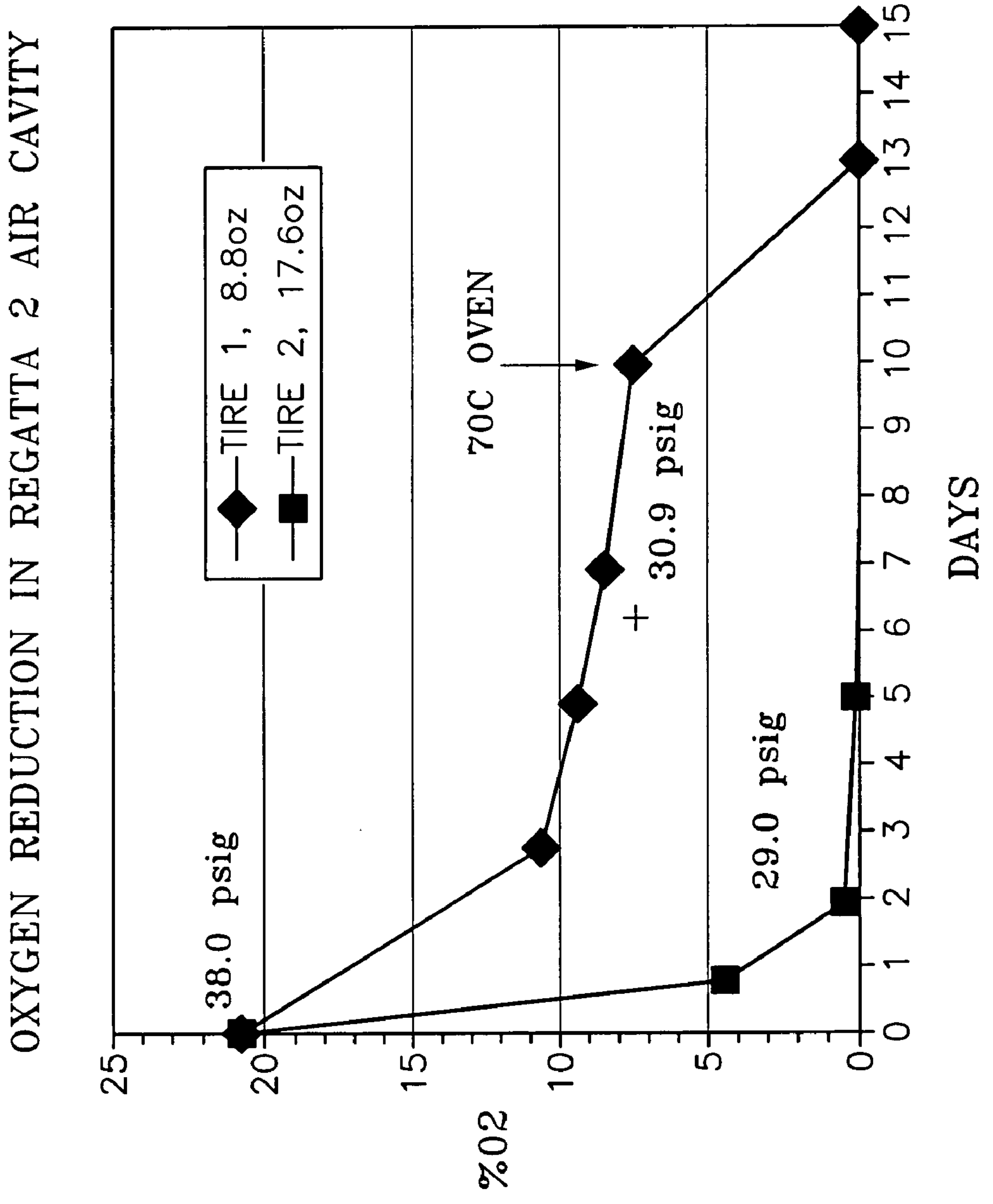
FIG. 5 is a graph illustrating oxygen reduction in an air cavity of a mounted tire using oxygen scavenging material in accordance with the present invention.

As shown in FIG. 5, oxygen reduction in the air cavities occurred immediately. After 3 days, the internal tire pressure was about 29 psig and essentially no oxygen was detected in the air cavity with about 500 g of oxygen scavenging material. Concerning the air cavity containing about 250 g of oxygen scavenging material, after about 10 days, the internal tire pressure was about 30.9 psig with the oxygen content being reduced to about 7%. Thereafter, the tire containing 250 g of oxygen scavenging material was heated to about 70° C. After the $13^{th}$ day, no oxygen was detected in the air cavity and the internal air pressure was about 29 psig for the air cavity with 250 g of oxygen scavenging material. The oxygen content of each tire was measured by oxygen sensor means known in the art.

In another example, about 250 g of Santoflex 13, a rubber compounding antioxidant, available from Monsanto of St. Louis, Mo., may be used as the oxygen scavenging material in the air cavity of a mounted tire. In another example, about 250 g of ascorbic acid available from Sigma-Aldrich may be used as the oxygen scavenging material. In yet another example, a baker's yeast mixture including about 250 g yeast, about 250 g sugar, about 250 g water, and about 10 g calcium oxide (CaO) may be used as the oxygen scavenging material. Equal parts of sugar and 75° C. water are used to promote the fermentation reaction discussed above with the calcium oxide being used to scavenge the $CO_2$ and excess $H_2O$.

Accordingly, there are provided oxygen scavenging materials 10 and uses thereof for reducing oxygen content in air cavities 12 of mounted tires 14, such as to reduce oxidation of the tire 14 and/or increase tire pressure retention.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method for reducing oxygen content in an air cavity of a mounted tire, comprising:
- providing a tire including an inner surface defining a tire cavity and a wheel including a rim for receiving the tire;
- situating oxygen scavenging material, which includes a microorganism, within the tire cavity;
- mounting the tire on the tire rim to define an air cavity, the oxygen scavenging material being located within the air cavity; and
- filling the air cavity with air comprising oxygen to a desired internal air pressure, the oxygen scavenging material being provided in an amount sufficient for reducing oxygen content in the air cavity.

2. The method of claim 1, wherein the situating step includes placing the oxygen scavenging material within the tire cavity.

3. The method of claim 1, wherein the situating step includes securing the oxygen scavenging material to the rim.

4. The method of claim 3 wherein the step of securing includes securing a container including the oxygen scavenging material around the rim.

5. The method of claim 4 wherein the container includes a plurality of apertures for exposing the oxygen scavenging material to the air cavity.

6. The method of claim 4 wherein the container comprises elastomeric material, the elastomeric material being permeable to expose the oxygen scavenging material to the air cavity.

7. A method for reducing the oxygen content in an air cavity of a mounted tire, comprising:
- providing a tire mounted on a tire rim defining an air cavity; and
- placing a canister comprising oxygen scavenging material on a valve associated with the air cavity, the oxygen scavenging material being in an amount sufficient for reducing the oxygen content in the air cavity.

8. The method of claim 7 wherein the oxygen scavenging material includes a metal or metal based material, an antioxidant, or a microorganism.

9. A method for reducing oxygen content in an air cavity of a mounted tire, comprising:
- providing a tire including an inner surface defining a tire cavity and a wheel including a rim for receiving the tire;
- situating oxygen scavenging material within the tire cavity;
- mounting the tire on the tire rim to define an air cavity, the oxygen scavenging material being located within the air cavity; and
- overfilling the air cavity with air comprising oxygen to a desired internal air pressure that is no greater than about 21% of the manufacturer's recommended air pressure, the oxygen scavenging material being provided in an amount sufficient for reducing oxygen content in the air cavity.

10. The method of claim 9, wherein the situating step includes placing the oxygen scavenging material within the tire cavity.

11. The method of claim 9, wherein the oxygen scavenging material includes a metal or metal-based material.

12. The method of claim 11 wherein the metal is iron.

13. The method of claim 9 wherein the oxygen scavenging material includes an antioxidant.

14. The method of claim 13 wherein the antioxidant includes an ascorbic acid based material.

15. The method of claim 9, wherein the situating step includes securing the oxygen scavenging material to the rim.

16. The method of claim 15 wherein the step of securing includes securing a container including the oxygen scavenging material around the rim.

17. The method of claim 9 wherein overfilling the air cavity with air comprising oxygen to a desired internal air pressure that is no greater than about 21% of the manufacturer's recommended air pressure comprises overfilling the air cavity with air comprising oxygen to a desired internal air pressure of about 21% greater than the manufacturer's recommended air pressure.

18. The method of claim 17 wherein the container includes a plurality of apertures for exposing the oxygen scavenging material to the air cavity.

19. The method of claim 17 wherein the container comprises elastomeric material, the elastomeric material being permeable to expose the oxygen scavenging material to the air cavity.

* * * * *